(12) United States Patent
Niebuhr

(10) Patent No.: US 7,712,563 B2
(45) Date of Patent: May 11, 2010

(54) BATTERY EXCHANGE SYSTEM FOR A BATTERY-DRIVEN INDUSTRIAL TRUCK

(75) Inventor: Michael Niebuhr, Bargteheide (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 201 days.

(21) Appl. No.: 11/773,505

(22) Filed: Jul. 5, 2007

(65) Prior Publication Data
US 2008/0006459 A1    Jan. 10, 2008

(30) Foreign Application Priority Data
Jul. 7, 2006    (DE) ...................... 10 2006 031 461

(51) Int. Cl.
*B60K 1/04* (2006.01)
(52) U.S. Cl. .................. 180/68.5; 180/311; 180/312
(58) Field of Classification Search ............... 180/68.5, 180/65.1, 311, 312; 429/100, 23, 179, 163, 429/99, 120
See application file for complete search history.

(56) References Cited

U.S. PATENT DOCUMENTS

| | | | | |
|---|---|---|---|---|
| 905,176 | A * | 12/1908 | Gruenfeldt | 180/68.5 |
| 3,708,028 | A * | 1/1973 | Hafer | 180/65.1 |
| 3,760,770 | A * | 9/1973 | Weaver et al. | 119/57.6 |
| 4,275,131 | A * | 6/1981 | Richards | 429/163 |
| 5,301,765 | A * | 4/1994 | Swanson | 180/68.5 |
| 5,559,420 | A * | 9/1996 | Kohchi | 180/68.5 |
| 5,585,205 | A * | 12/1996 | Kohchi | 429/99 |
| 5,760,569 | A * | 6/1998 | Chase, Jr. | 320/104 |
| 6,631,775 | B1 * | 10/2003 | Chaney | 180/68.5 |
| 7,201,384 | B2 * | 4/2007 | Chaney | 180/68.5 |
| 7,389,841 | B2 * | 6/2008 | Boville | 180/68.5 |
| 7,398,848 | B2 * | 7/2008 | Kondo | 180/68.5 |

FOREIGN PATENT DOCUMENTS

| | | |
|---|---|---|
| DE | 10145991 A1 | 4/2003 |
| DE | 10227000 A1 | 1/2004 |
| DE | 10333594 | 2/2005 |
| FR | 2705926 | 12/1994 |

* cited by examiner

*Primary Examiner*—Lesley Morris
*Assistant Examiner*—Bridget Avery
(74) *Attorney, Agent, or Firm*—Vidas, Arrett & Steinkraus, P.A.

(57) ABSTRACT

Battery exchange system for a battery-driven industrial truck, in which the chassis of the industrial truck comprises a battery compartment open to the side of the industrial truck for side installation and removal of a battery container, on the battery container on at least two opposing sides at least one respective laterally projecting support element being attached with a downwardly facing bearing surface and the battery compartment on opposing sides comprising horizontal support surfaces spaced apart from one another in parallel on which the support elements are supported with their bearing surfaces, when the battery container is inserted into the battery compartment.

26 Claims, 4 Drawing Sheets

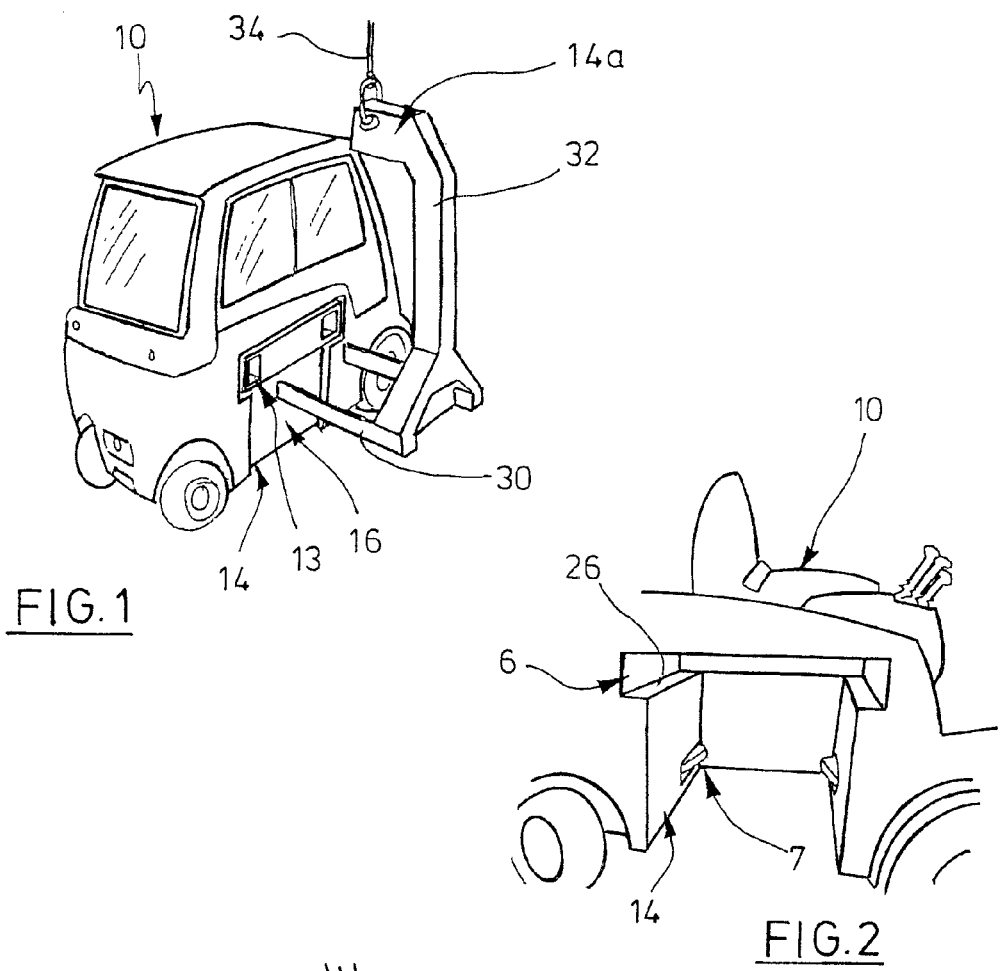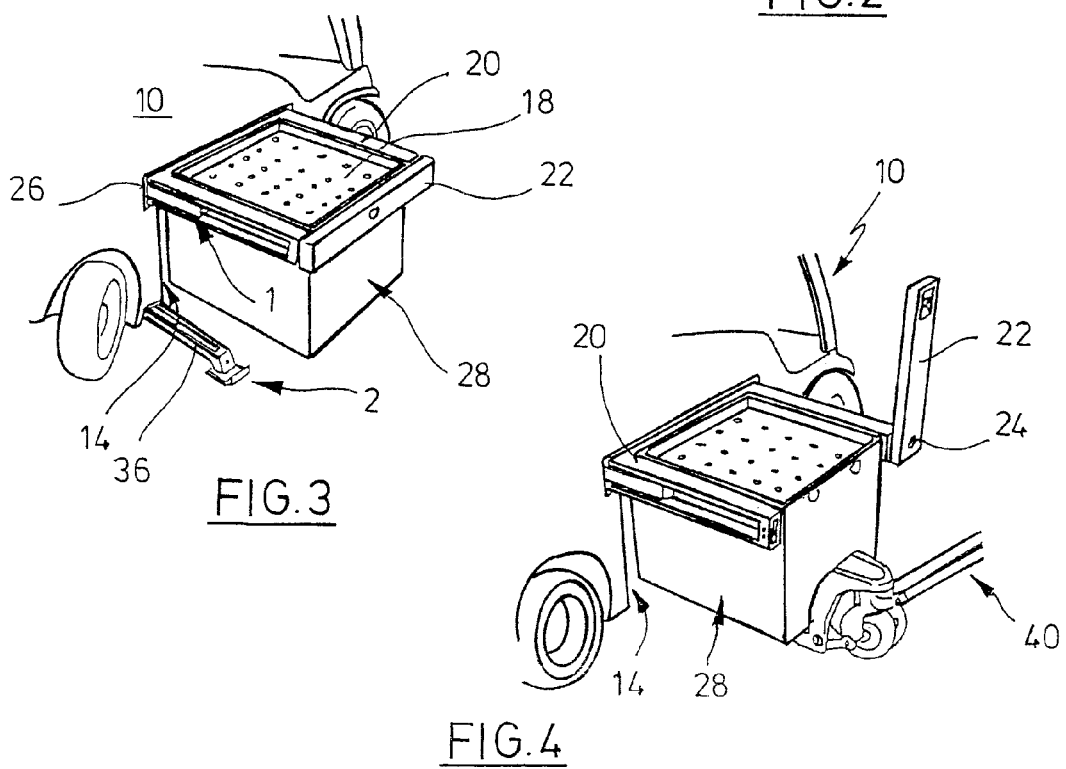

BATTERY EXCHANGE SYSTEM FOR A BATTERY-DRIVEN INDUSTRIAL TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

A battery exchange system for industrial trucks has become known from DE 103 33 594, the entire contents of which is incorporated herein by reference, in which the vehicle chassis comprises a side opening for receiving a battery. The battery is generally located in a so-called battery container. A profile strip is attached to the battery container, and which comprises an undercut on the underside. Spacers are attached to the lifting carriage of a forklift, on which generally fork aims are suspended, which engage under the profile strip. It is, therefore, possible to receive and to transport a battery by means of the lifting carriage. So that this process may be carried out, firstly the fork arms have to be removed from the load carriage and then the spacers positioned. Subsequently, the forklift is driven towards the other vehicle so that by means of the spacers the battery may be received. This requires, however, that the profile strip is never located more deeply than the level of the spacer.

Generally, a battery space accessible from the side in counterbalance forklift trucks brings advantages relative to the aforementioned solutions. When removing the battery, no components inside the operating space have to be awkwardly folded away or removed. The battery does not have to be moved in the region of the operating space, which prevents damage of delicate components in this region. Unnecessary lifting of the battery which poses a risk to the immediate vicinity of personnel is not required. However, the use of a forklift with removable fork arms is necessary. By the complete separation of the battery compartment and operating space a good seal of the passenger compartment is possible relative to sound, rain and battery gases. The disclosed known solution may not be applied to all variants of battery maintenance and battery removal and exchange associated with side battery removal.

The object of the invention, therefore, is to provide a battery exchange system for battery-driven industrial trucks, which makes it possible for the total height of the forklift to be as low as possible in spite of the side installation of the battery and the use of different variants of battery removal without alterations to the vehicle being required.

BRIEF SUMMARY OF THE INVENTION

The support elements may be formed from support strips which, for example, surround the battery container as a frame. Alternatively, U-shaped support elements may also be provided which are attached to opposing ends, encompassing the box with the arms. The support elements have downwardly facing bearing surfaces which project laterally over the contour of the battery container. In the battery compartment, complementary support surfaces are provided on which the bearing surfaces are supported when the battery is inserted into the battery compartment.

The attachment of support elements in terms of height may be relatively freely selected, an attachment in the upper region of the container being preferred and namely such that the support elements do not project upwards over the upper edge of the battery container. The battery compartment is thus designed to be only slightly wider than the battery container, the support surfaces being located laterally set back.

Generally, the battery containers have very large batteries, as they are used in industrial trucks, and in the upper region so-called crane eyes in order to move said batteries by means of a crane and to install into and remove from a vehicle. According to the invention, such eyes may be used in order to attach the support elements externally to the battery container. To this end, one embodiment of the invention provides that the support elements comprise a pin-shaped lateral projection which is passed through an eye. In the eye, the projection may be secured against withdrawal, for example by a split pin. An alternative embodiment of the invention provides that the pin-shaped projection comprises a spring-biased detent catch, which lockingly engages behind the rear edge of the eye when the pin-shaped projection is inserted into the eye.

The solution according to the invention comprises a series of advantages. The total height of the forklift may be low in order to allow driving into and driving through low spaces, storage areas, containers, doors and thoroughfares. As the support elements are attached to lateral faces of the battery container, the structural height of the battery container alone determines the total height of the forklift in addition to the predetermined height of the operating space located thereover and the predetermined ground clearance. No holders or other components project below or above the battery container.

In the system according to the invention, the battery may be secured against falling out of the vehicle by an integrated battery securing device. To this end, the support elements may comprise locking elements which cooperate with locking elements on the vehicle chassis.

By the use of different support elements, different types of solutions for overcoming the problems with so-called battery handling may be implemented without the vehicle chassis having to be altered. Thus, on the one hand, a particularly inexpensive solution is created, and on the other hand a particularly comfortable handling is made possible.

The battery compartment is preferably externally closed. To this end, a casing for the battery compartment may be attached to the support elements. Alternatively, the battery compartment may be sealed by an external flap which is either suspended pivotably as a door or is fixedly attached by screwing to the chassis of the industrial truck.

So that the battery is securely received in the compartment, a further embodiment of the invention provides at least one clamping element in the battery compartment, which laterally engages the received battery container. To this end, a rubber wedge or a spring-loaded catch may be provided. An electromechanically or hydraulically actuatable clamping element is also conceivable for selective engagement with the battery container.

When the battery compartment is fully or substantially open at the bottom, the fork arms of a forklift may grip the battery container from below and move said battery container outwards. This is irrespective of the distance of the fork arms from one another, as long as the width of the battery container and/or the battery compartment is not exceeded.

Alternatively it is conceivable to provide a cooperating telescopic guide between the support element and the battery compartment, for removing the battery container in the manner of a drawer from the battery compartment. Such telescopic guides are known per se for furniture drawers, grill racks in cookers, etc.

When a battery container is moved laterally out of the battery compartment by means of such a guide, a not inconsiderable tilting moment results on the forklift. So that it is secured against tilting, one embodiment of the invention may provide that the vehicle comprises a supporting device, which laterally supports the industrial truck when the battery container is moved out from the side.

According to a further embodiment of the invention, the supporting device may be automatically moved into the supporting position, when the battery container is removed.

To remove a battery container from the battery compartment it is also conceivable to insert movable roller tracks which are pushed under the battery compartment. In order to be able to position the battery container on the roller track, in a further embodiment of the invention it is provided that a lifting device is arranged between the support elements and the battery container. Alternatively, a lifting device may also be provided between the support surfaces and the vehicle chassis. For actuating the lifting device, a rotating spindle may be provided in the manner of a jack mechanism. Alternatively, an external drive may also be provided with a cordless screwdriver or a compressed air screwdriver. For receiving by means of the roller track the entire underside of the battery container is open. Between the battery container and the walls of the battery compartment, a gap may be provided through which lateral guide surfaces of roller tracks or exchange devices facilitate the installation and removal. By means of a roller track, the battery may be directly transferred to a horizontal roller track installation at the same level.

An alternative arrangement for battery exchange consists according to the invention in that the support elements comprise two insertion pockets spaced apart from one another in parallel with openings which face the opening of the battery compartment. A C-shaped hook is further provided with two aims spaced apart from one another in parallel in the lower region which move into the insertion pockets. An upwardly facing arm of the hook may be suspended on a lifting device extending above.

After the installation of the battery container, the connection of the onboard power supply to the battery has to be made. In this connection a further embodiment of the invention provides that in one support element a first contact arrangement is integrated which cooperates with a contact arrangement on the vehicle side when the battery container is inserted into the battery compartment. Preferably the contact arrangements form a rapid coupling system which carries out an automatic contact. In this connection, rapid exchange of the battery is possible without having to disconnect a battery connector. In this case, the charging station may expediently be provided with a contact arrangement which corresponds to the second contact arrangement in order to allow the rapid connection of the battery to the charging unit.

BRIEF DESCRIPTION OF THE SEVERAL VIEWS OF THE DRAWINGS

Embodiments of the invention are described in more detail hereinafter with reference to drawings, in which:

FIG. 1 shows in perspective an industrial truck with a side battery compartment and received battery container, FIG. 2 shows in enlarged perspective a side view of the industrial truck according to FIG. 1 with an empty battery compartment, FIG. 3 shows the industrial truck according to FIG. 1 with the battery container withdrawn in a modified embodiment, FIG. 4 shows a similar view to FIG. 3 with a possibility for removing the battery container from a telescopic guide.

DETAILED DESCRIPTION OF THE INVENTION

Figure 5:
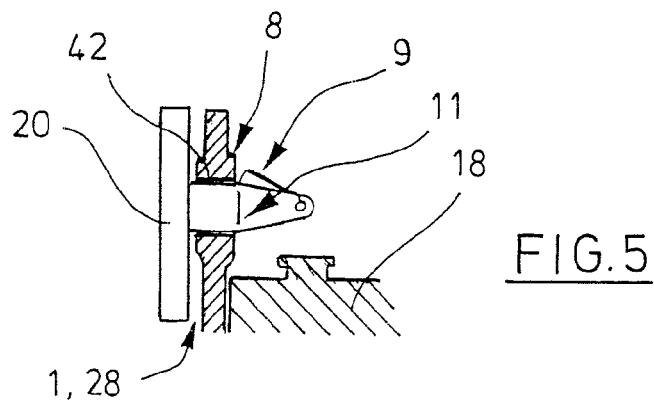
FIG. 5 shows a section through a support element of a battery container in the region of a fixing on the edge of the battery container.

While this invention may be embodied in many different forms, there are described in detail herein a specific preferred embodiment of the invention. This description is an exemplification of the principles of the invention and is not intended to limit the invention to the particular embodiment illustrated An industrial truck 10 is indicated in FIGS. 1 to 4 which is of conventional construction. In the case shown the industrial truck is a counterbalanced forklift truck. Details thereof are not explained.

As emerges from FIGS. 1 to 4, the industrial truck comprises a battery compartment 14 which is open to the side for receiving a battery container 16. As emerges from FIGS. 3 and 4, the battery container which projects over the battery 18 with its edge 8 (FIG. 5), is provided with frame-like support elements. In FIGS. 3 and 4, a U-shaped frame part 20 may be seen which surrounds the battery container from the rear and to the side. Heightwise, the frame part 20 does not extend higher than the edge 8 of the battery container. At the free ends, the arms of the U-shaped frame part 20 strike a strip-like support element 22 which—as may be seen in FIG. 4 at 24—may be pivoted upwardly about a horizontal axis which extends through the arm to the right in FIGS. 3 and 4. The frame part 20 and the strip-like support element 22 comprise downwardly facing horizontal bearing surfaces (not visible) which are located approximately in one plane.

As may be seen in particular in FIG. 2, the battery compartment 14 in the upper region is provided with widened portions 6 extending on both sides, which form upwardly facing horizontal support surfaces 26. A battery container as is shown in FIGS. 3 and 4 and denoted by 28, may be inserted approximately positively into the battery compartment, the front face of the battery container 28 being slightly retracted relative to the skin of the vehicle 10, so that the battery compartment 14 may be sealed by a cover, casing or flap (not shown). The battery compartment 14 is fully open at the bottom, so that a forklift may move with its fork under the compartment 14 and insert a battery into or remove a battery from the compartment 14. In FIG. 1 it may be seen that a similar frame as is shown in FIGS. 3 and 4, is provided on the front face with insertion pockets 13 which extend a predetermined distance into the supporting frame. Parallel arms 30 of a C-shaped hook 14a are inserted into the pockets 13, the arms being connected to a vertical supporting arm 32—which is shown at 34—which may be suspended on a hoist. Therefore, the received battery container may be installed and/or removed by means of the hook 14a.

In FIG. 2 it may be seen that in the battery compartment 14 catches 7 are arranged on opposing sides. The catches 7 are biased by a spring (not shown) and come into engagement with the facing sides of the inserted battery container, in order to define said battery container laterally and to prevent striking against the lateral walls of the battery compartment 14.

It is further shown in FIGS. 3 and 4 that on the arms of the U-shaped supporting part 20 a telescopic guide 1 is provided which cooperates with corresponding guide means in the widened portions 6 of the battery compartment 14. In this manner, the battery container may be moved out of the battery compartment 14, for example for maintenance and charging purposes.

Such telescopic guides 26 are, for example, known in drawers in furniture.

So that the vehicle 10 does not tilt, a radial arm 36 is provided which laterally supports the vehicle 10 when the battery container 28, as shown in FIG. 3, is laterally moved in the vicinity of the vehicle 10. The radial arm 36 may be actuated manually or even automatically extended when the battery container 28 is pushed outwardly. Conversely, the radial arm 36 may be automatically retracted when the battery is inserted into the battery compartment 14.

When it is also necessary to release the battery container 28 from the vehicle 10, the support element 22 is pivoted upwards as shown in FIG. 4. Before pivoting, the connection between the U-shaped support part and the battery container 28 is released, so that by means of a hand pallet truck 40 or the like the battery may be removed.

The fastening of the support part 20 or even the support element 22 is shown in FIG. 5. At least one pin-like projection 11 is provided, which extends through an opening 42 in the edge 8 of the battery container 14 and/or 28. In the pin-like projection 11 a catch 9 is mounted in a spring-loaded manner, which normally adopts the position shown in FIG. 5, in which it engages behind the edge of the opening 12 remote from the support part 20. The outer face of the catch 9 is provided with an oblique surface so that the pin-like projection 11 may be passed easily through the opening 12.

Figure 6:
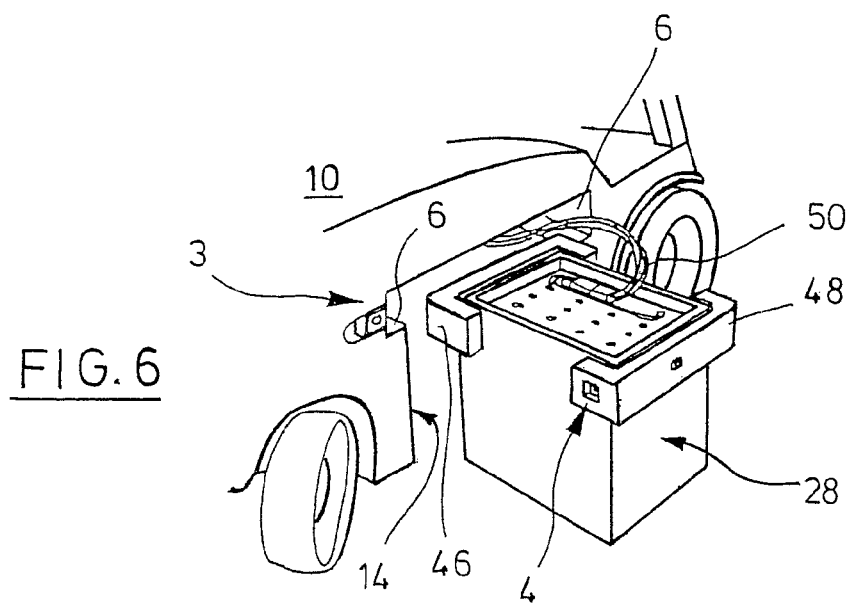
FIG. 6 shows a similar view to FIG. 3 with a further embodiment of support elements.

In FIG. 6 it is shown how two U-shaped support elements 46, 48 are provided on opposing sides of the battery container 28, encompassing said battery container with the arms. The upper face of the support elements 46, 48 is in turn flush with the upper edge of the battery container 28. The fastening of the support elements 46, 48 may be carried out in a similar manner as is shown in connection with FIG. 5.

In FIG. 6, a locking part 3 in the region of a widened portion 6 of the battery compartment 14 is moreover visible. The locking arrangement cooperates with a locking part 4 in one arm of the U-shaped support element 48, when the battery container 28 is fully inserted into the battery compartment 14. In this manner the battery container 28 is prevented from slipping out or falling out of the battery compartment 14.

Figure 7:
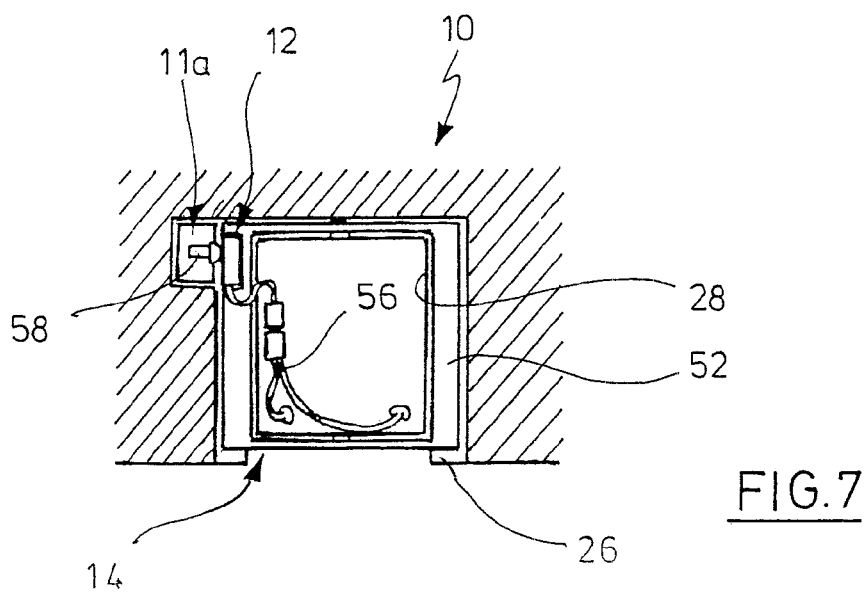
FIG. 7 shows a horizontal section through an industrial truck with the received battery container and an electrical connection to the onboard power supply.

In FIG. 6 at 50 a battery cable is indicated which leads from the battery via a connector, not shown, to a terminal of the onboard power supply. In FIG. 7 it is shown that such a cable is not required.

In FIG. 7 a plan view of the battery container 28 is shown inside the battery compartment 14, it being visible that the support elements are again formed by a peripheral frame 52. It may further be seen in FIG. 7 that in a longitudinal portion of the frame 52 a first contact arrangement 12 is integrated, which is connected to the battery terminals via a connecting cable 56. In the region of the widened portion 6 a second contact arrangement 11a is installed—which is not shown—which is connected to the onboard power supply and comprises two movable contact pins, of which one is shown at 58. If the battery container 28 is inserted into the compartment 14, the contacts of the contact arrangements 12 and 11a are automatically in engagement so that as a result the connection to the onboard power supply is created without additional handles being required.

Figure 8:
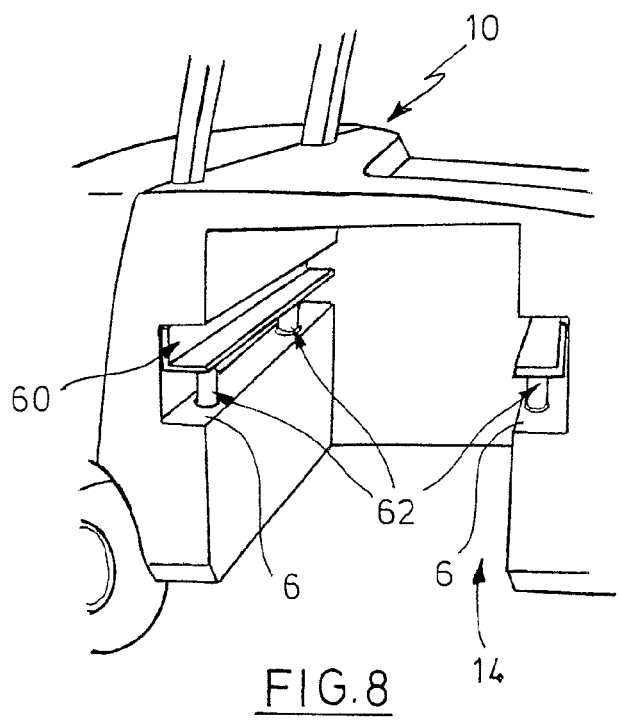
FIG. 8 shows in perspective a further embodiment of a battery space for an industrial truck.

In FIG. 8 the battery receiving space 14 is indicated in the industrial truck 10, with lateral elongate recesses 6 as has already been mentioned in particular in connection with FIG. 2. Angle sections 60 are seen in the recesses which are supported by hydraulic rams 62. By means of the hydraulic rams 62 the angle sections 60 may be lifted. If a battery container 28 is located with the lateral support elements, as has already been described further above, on the angle sections 60, then said battery container may be lifted by a certain distance, so that a roller track may be pushed under and lowering onto the roller track is possible in order to remove the received battery.

Figure 9:
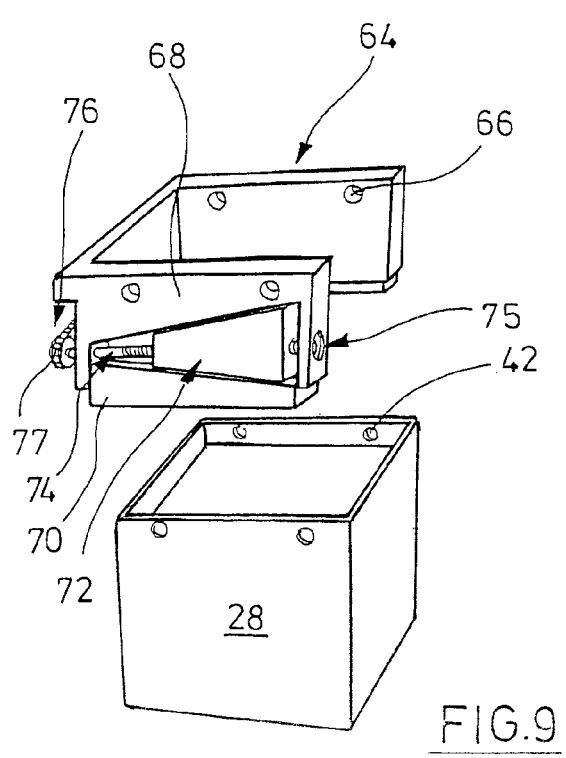
FIG. 9 shows in perspective a lifting device for lifting a battery container.

In FIG. 9 a U-shaped support element 64 is shown, which encompasses the battery container 9 on three sides and may be attached thereto via holes 66 coinciding with the holes 42 in the battery container by suitable fastening means. The arms of the support element 64 have, with regard to the retaining in the industrial truck, the same function as the aforementioned support elements. The arms of the support element 64 according to FIG. 9 are divided into two portions. The upper portion 68 is formed integrally with the web of the U-shaped support element 64. A lower portion 70 is a separate part. The surfaces of the portions 68, 70 facing one another, extend at the same angle to one another. A wedge 72 of complimentary configuration is arranged between these surfaces and may be moved by means of a threaded spindle 74. The drive of the threaded spindle is carried out via an opening 75 in the fixed part of an arm. In this manner, the height of the U-shaped support element 64 may be altered and thus also the height of the battery container 28 above the base. It is understood that such a height adjustment may also be provided for the other arm, which however may not be seen in FIG. 9. In order to bring about a displacement from only one position, a chain wheel 77 is coupled to the spindle 74 at the other end, which is drive-connected to a further chain wheel via a chain, which also displaces the wedge for the other arm via a spindle.

Figure 10:
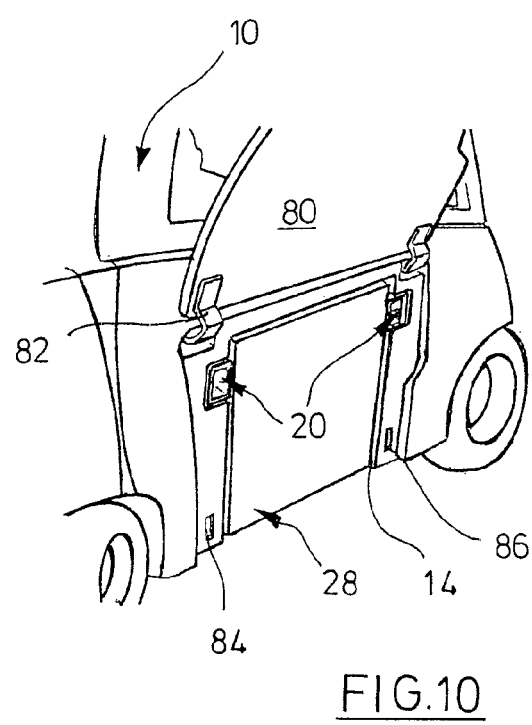
FIG. 10 shows in perspective the side view of an industrial truck with the received battery container and closure flap.

In FIG. 10 it is indicated how the battery space 14 may be externally covered by a flap 80, which is hinged to the industrial truck at 82 via hinges. Locking openings 84, 86 on both sides of the battery space 14 serve to secure the flap 80 in a closed position.

Figure 11:
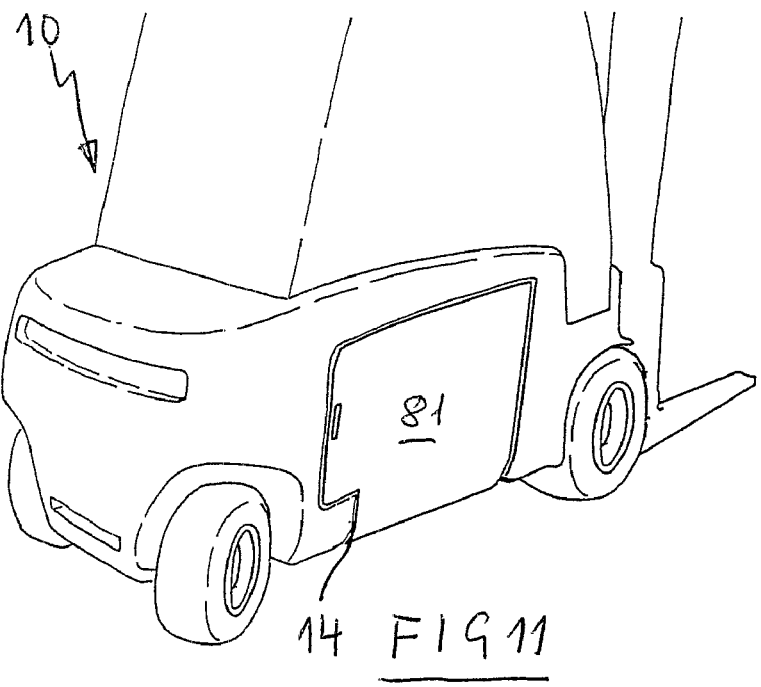
FIG. 11 shows a flap for a battery compartment.
Figure 12:
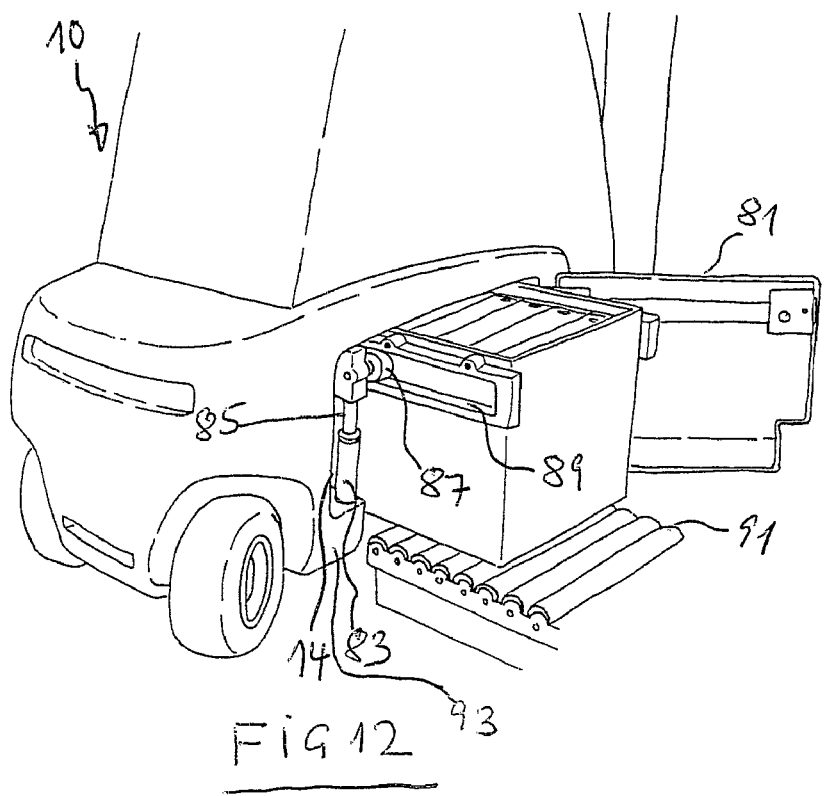
FIG. 12 shows the opened flap of FIG. 11 and lifting means for a battery.

In FIG. 11 a battery compartment 14 is closed by a flap 81 which is shown in FIG. 12 in opened state. Hinges for flap 81 are located laterally.

Lifting cylinders within the battery compartment are located on opposite sides one of which shown at 83. The cylinder 83 is supported on a shoulder 13 in compartment 14. The piston rod of the cylinder 83 supports at the free end thereof a roll 87 which engage a guide way 89 of lateral support members 20. The lifting cylinders 83 are designed to lower the battery container 28 onto a roller way 91 or to lift the battery container from the roller way 91. The guide way 89 is preferably open at the inner end to allow the removal or the insertion of a battery container 28 (not shown).

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

What is claimed is:

1. Battery exchange system for a battery-driven industrial truck, in which the chassis of the industrial truck comprises a battery compartment open to the side of the industrial truck for side installation and removal of a battery container, characterized in that on at least two opposing sides on the upper edge (8) of the battery container (14, 28) at least one eye (42) is provided and support strips (20, 22, 46, 48) are attached to the eyes (42), the strips having downwardly facing bearing surfaces and the battery compartment (14) on opposing sides comprises horizontal support surfaces (26) spaced apart from one another in parallel on which the support strips are supported with their bearing surfaces, when the battery container (16, 28) is inserted into the battery compartment (14).

2. Battery exchange system according to claim 1, characterized in that the support strips form a frame (20, 22) surrounding the battery container (28).

3. Battery exchange system according to claim 1, characterized in that two U-shaped support elements (46, 48) are attached to the battery container (28) on opposing sides.

4. Battery exchange system according to claim 1, characterized in that the support strips are attached in the upper region of the battery container and at the top approximately adjoin the upper edge thereof.

5. Battery exchange system according to claim 1, characterized in that the bearing surfaces are arranged between the upper and lower face of the battery container.

6. Battery exchange system according to claim 1, characterized in that the width of the battery compartment (14) is only slightly larger than the dimensions of the battery container (28) and the support surfaces (26) are laterally set back.

7. Battery exchange system according to claim 1, characterized in that the support strips comprise a pin-shaped projection (11).

8. Battery exchange system according to claim 1, characterized in that a casing for the battery compartment is attached to the support element facing the opening of the battery compartment (14).

9. Battery exchange system according to claim 1, characterized in that the lateral opening of the battery compartment (14) may be sealed by a flap (80) which is attached to the chassis of the industrial truck (10).

10. Battery exchange system according to claim 1, characterized in that in the battery compartment (14) at least one clamping element (7) is provided which laterally engages a received battery container.

11. Battery exchange system according to claim 1, characterized in that the battery compartment (14) is open at the bottom to such an extent that the fork arms of a forklift may grip the battery container from below.

12. Battery exchange system according to claim 1, characterized in that between the support strips and the battery compartment a cooperating telescopic guide (1) is provided for removing the battery container (28) in the manner of a drawer from the battery compartment (14).

13. Battery exchange system according to claim 1, characterized in that the battery container (28) may be removably attached to the support strips (20).

14. Battery exchange system according to claim 1, characterized in that a lifting device (72 to 77) is arranged between the support strips (64) and the battery container (28).

15. Battery exchange system according to claim 1, characterized in that a lifting device (60, 62) is arranged between the support surfaces (60) and the support frame (20).

16. Battery exchange system according to claim 1, characterized in that the support strips comprise two insertion pockets (13) spaced apart from one another in parallel, the opening thereof facing the opening of the battery compartment (14) and a C-shaped hook (14) is provided with two arms (30) spaced apart from one another in parallel which may be inserted into the insertion pockets (14).

17. Battery exchange system according to claim 1, characterized in that a support strip comprises an integrated first contact arrangement (12) which cooperates with a second contact arrangement (11a) on the vehicle side when the battery container (28) is inserted into the battery compartment (14).

18. Battery exchange system according to claim 1, characterized in that on the support ustrip (48) first locking means (4) are provided which cooperate with second locking means (3) in the battery compartment (14).

19. Battery exchange system according to claim 7, characterized in that the pin-shaped projection may be secured by a split pin.

20. Battery exchange system according to claim 7, characterized in that the pin-shaped projection (11) comprises a spring-biased detent catch (9), which lockingly engages behind the rear edge of the eye (42) when the pin-shaped projection (11) is inserted into the eye (42).

21. Battery exchange system according to claim 10, characterized in that the clamping element is formed by a spring-loaded catch (7).

22. Battery exchange system according to claim 10, characterized in that the clamping element may be actuated for selective engagement with the battery container.

23. Battery exchange system according to claim 12, characterized in that a supporting device (36) is associated with the support strips, which laterally supports the industrial truck (10) when the battery container (28) is removed to the side.

24. Battery exchange system according to claim 23, characterized in that the supporting device is configured such that it is automatically moved into a support position, when the battery container (28) is removed.

25. Battery exchange system according to claim 17, characterized in that the two contact arrangements (12, 11) form a rapid coupling system which carries out an automatic contact and disconnection of the contacts.

26. Battery exchange system according to claim 18, characterized in that the locking means (4, 3) are configured and arranged such that they may be unlocked from outside.

* * * * *